Patented Oct. 11, 1949

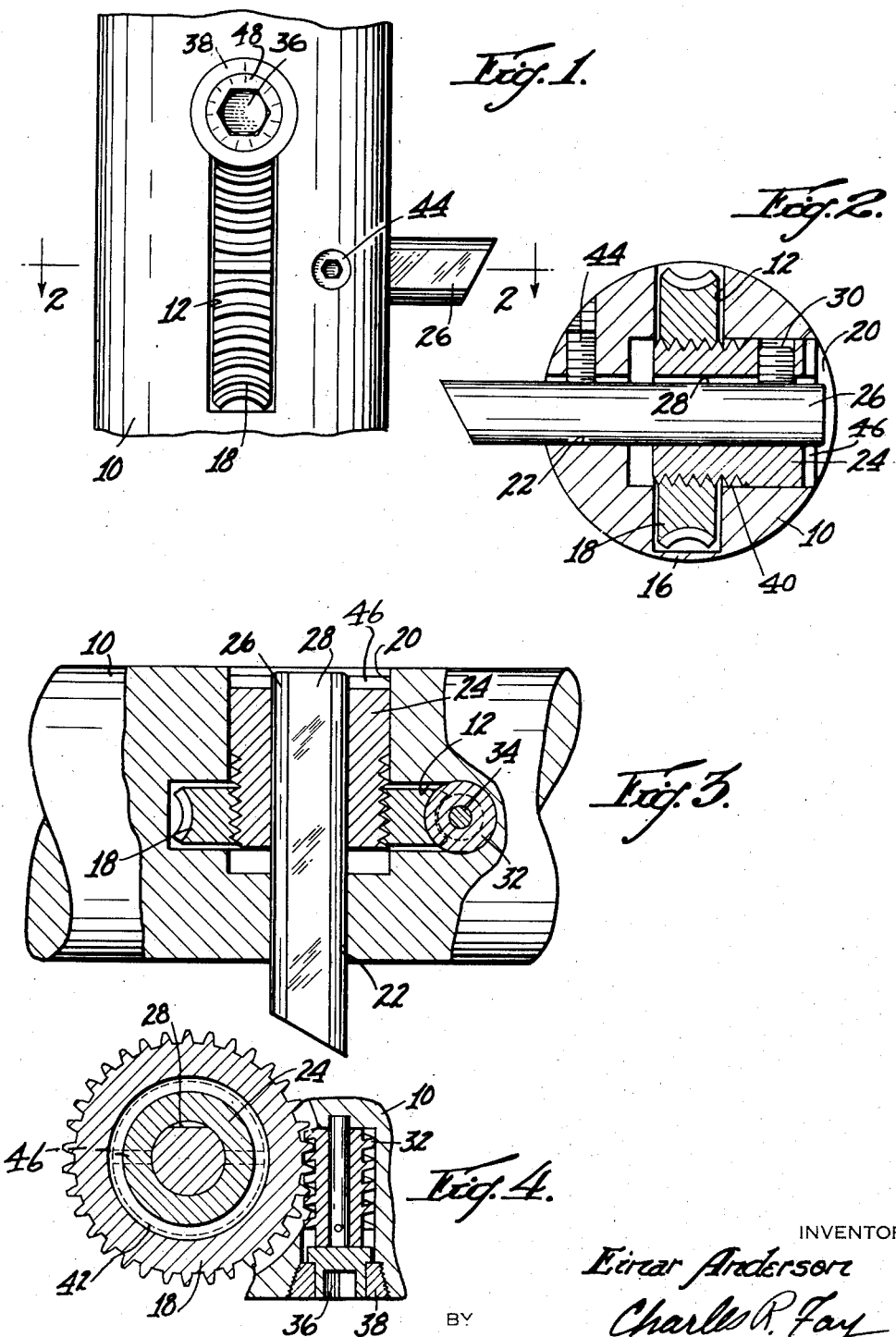
Oct. 11, 1949.     E. ANDERSON     2,484,480
ADJUSTMENT FOR BORING BAR TOOLS
Filed Jan. 14, 1948.
INVENTOR.
Einar Anderson
Charles R. Fay
BY ATTORNEYS.

2,484,480

UNITED STATES PATENT OFFICE 2,484,480

ADJUSTMENT FOR BORING BAR TOOLS

Einar Anderson, Leominster, Mass.

Application January 14, 1948, Serial No. 2,209

1 Claim. (Cl. 77—56)

This invention relates to micromatic adjustments for boring bar tools and bits and the principal object of the invention resides in the provision of a worm gear arranged to rotate a worm wheel in a boring bar, the worm wheel being internally threaded to mesh with a tool bushing to move the latter axially of the worm wheel, the tool bushing holding a tool or bit and moving the same therewith, for very fine and positive adjustment of the cutting radius of the tool.

Further objects of the invention reside in the provision of a boring bar tool adjustment as above stated including means to restrain the tool and tool bushing from rotation with the worm wheel.

Another object of the invention resides in the provision of a boring bar having a short central longitudinal slot therein accommodating a worm wheel, a worm gear arranged radially of the boring bar and held thereby in mesh with the worm wheel, the latter being centrally apertured and threaded for threaded reception of a tool bushing extending axially of the worm wheel and diametrically of the boring bar, the tool bushing being located in a radially arranged opening in the boring bar intersecting the slot, and a tool held in the tool bushing axially thereof and adjustable radially of the boring bar with the bushing.

Other objects and advantages of the invention will appear hereinafter.

Reference is to be had to the accompanying drawing in which

Fig. 1 is a view in elevation of a boring bar provided with the present invention;

Fig. 2 is a section on line 2—2 of Fig. 1;

Fig. 3 is a longitudinal section through the boring bar; and

Fig. 4 is a detail of the worm gear and wheel.

In the drawing, the boring bar is shown at 10, and is provided with a slot 12 extending centrally longitudinally thereof and from side to side of the boring bar diametrically. At one side the slot may terminate short of the surface of the boring bar as at 16 in order to enclose the slot as much as possible. A worm wheel 18 is located in the slot closely fitting the side walls thereof to prevent lateral play, and if desired an ordinary cover could be provided to close the slot to conceal the worm wheel and prevent the entrance of chips.

Radially of the boring bar and centrally of slot 12 there is a circular bore or opening 20 extending from one side of the boring bar across the slot. This bore is centrally reduced as at 22 and the reduced bore extends the remainder of the distance across the boring bar. The bore 20 accommodates a cylindrical hollow bushing 24 which is slidable therein and mounts a tool 26 having a flat 28 for a set screw 30, in the bushing to hold the tool and bushing together.

The worm wheel is turned on its axis by a worm gear 32 mounted to rotate in a bore in the boring bar on a center pin 34 having an exposed allen head 36 held in a bushing 38.

The bushing 24 is provided with exterior threads 40 over a portion of its surface, these threads meshing with internal threads 42 in the worm wheel, so that as the worm 32 is rotated, the wheel is rotated and the bushing 24 and tool are moved micromatically radially of the boring bar. After the desired setting is achieved, a set screw 44 may be tightened to fix the position of the tool, and this set screw also insures that the tool and bushing will always remain in fixed rotational position.

It will be seen that this invention provides a comparatively inexpensive positive micromatic tool adjustment of the class described.

The bushing 24 may be provided with radial slots 46, so that upon backing off screw 44 sufficiently, a tool may be used to rotate the bushing 24 thus feeding it rapidly relative to worm wheel 18 for a quick, coarse adjustment. Scale marks 48 may be employed to indicate the degree of adjustment of the tool by the worm wheel.

Having thus described my invention and the advantages thereof I do not wish to be limited to the details herein disclosed otherwise than as set forth in the claim, but what I claim is:

A device of the class described comprising a boring bar having a slot therein and an opening at right angles to the slot, the opening intersecting the slot, a worm wheel in the slot and substantially closely confined therein, for rotative motion only, the worm wheel being centrally open and internally threaded, a tool bushing holder in the opening and slidably fitting the same for lateral support therein, said holder being externally threaded and in mesh with the internal threads of the worm wheel, means holding the tool bushing holder against rotation so that rotation of the worm wheel causes axial movement only of the tool bushing holder, the bar having a second and smaller opening aligned and centrally arranged relatively to the first named opening, the tool bushing holder having an opening axially thereof and aligned and of like size with the second opening in the bar, a separable boring tool in the tool bushing holder and second opening, means removably clamping the boring tool therein, the boring tool being axially slidable in the said second and smaller boring bar opening as the worm wheel is rotated and the tool holding bushing is moved axially thereby, and the opening in the tool holder and the smaller tool receiving opening in the boring bar being of a size to just receive the tool and firmly support the same laterally.

EINAR ANDERSON.

REFERENCES CITED

The following references are of record in the file of this patent:

UNITED STATES PATENTS

| Number | Name | Date |
|---|---|---|
| 1,324,459 | Maier | Dec. 9, 1919 |
| 2,364,259 | Welsby et al. | Dec. 5, 1944 |

FOREIGN PATENTS

| Number | Country | Date |
|---|---|---|
| 21,727 | Great Britain | Sept. 26, 1913 |
| 118,630 | Germany | Mar. 20, 1901 |